(12) United States Patent
Park et al.

(10) Patent No.: US 10,419,626 B2
(45) Date of Patent: Sep. 17, 2019

(54) METHOD AND APPARATUS TO INPUT WORKFLOW STEPS AND PARAMETERS

(71) Applicant: HP PRINTING KOREA CO., LTD., Suwon-si, Gyeonggi-do (KR)

(72) Inventors: Hyun-wook Park, Gwacheon-si (KR); Sun-young Park, Suwon-si (KR); Hyun-sub Kil, Suwon-si (KR)

(73) Assignee: HP PRINTING KOREA CO., LTD., Suwon-si (KR)

( * ) Notice: Subject to any disclaimer, the term of this patent is extended or adjusted under 35 U.S.C. 154(b) by 0 days.

(21) Appl. No.: 15/146,552

(22) Filed: May 4, 2016

(65) Prior Publication Data

US 2016/0248930 A1    Aug. 25, 2016

Related U.S. Application Data

(60) Continuation of application No. 13/726,857, filed on Dec. 26, 2012, now Pat. No. 9,525,788, which is a
(Continued)

(30) Foreign Application Priority Data

Jun. 27, 2007   (KR) .................. 10-2007-0063813
Jul. 10, 2007   (KR) .................. 10-2007-0069356

(51) Int. Cl.
*H04N 1/00*     (2006.01)
*G06F 3/12*     (2006.01)
(Continued)

(52) U.S. Cl.
CPC ......... *H04N 1/0035* (2013.01); *G03G 15/502* (2013.01); *G03G 15/5075* (2013.01); *G06F 3/1205* (2013.01); *G06F 3/1253* (2013.01); *G06F 3/1275* (2013.01); *G06F 8/38* (2013.01); *G06F 9/45512* (2013.01);
(Continued)

(58) Field of Classification Search
CPC combination set(s) only.
See application file for complete search history.

(56) References Cited

U.S. PATENT DOCUMENTS 5,423,034 A    6/1995  Cohen-Levy et al.
5,890,130 A    3/1999  Cox et al.
(Continued)

FOREIGN PATENT DOCUMENTS

CN    1761943    4/2006
JP    2001-169039    6/2001
(Continued)

OTHER PUBLICATIONS

Office Action dated Jul. 27, 2015 in copending U.S. Appl. No. 12/054,550.
(Continued)

*Primary Examiner* — Helen Zong
(74) *Attorney, Agent, or Firm* — Staas & Halsey LLP

(57) ABSTRACT

An image forming method and apparatus, and a host in which the image forming method includes setting a processing order of a plurality of operations of a same image data and detailed setup information of the plurality of operations, and executing the plurality of operations using the detailed setup information according to the set processing order.

11 Claims, 12 Drawing Sheets

Related U.S. Application Data division of application No. 12/054,550, filed on Mar. 25, 2008, now abandoned.

(51) Int. Cl.
- *G06F 8/38* (2018.01)
- *G06F 9/455* (2018.01)
- *H04N 1/23* (2006.01)
- *H04N 1/32* (2006.01)
- *G03G 15/00* (2006.01)

(52) U.S. Cl.
CPC ..... *H04N 1/00204* (2013.01); *H04N 1/00278* (2013.01); *H04N 1/00464* (2013.01); *H04N 1/00962* (2013.01); *H04N 1/00973* (2013.01); *H04N 1/2307* (2013.01); *H04N 1/32561* (2013.01); *G03G 2215/00109* (2013.01); *H04N 2201/0094* (2013.01)

(56) References Cited

U.S. PATENT DOCUMENTS

| | | | |
|---|---|---|---|
| 6,407,753 | B1 | 6/2002 | Budinsky et al. |
| 6,624,908 | B1 | 9/2003 | Petchenkine et al. |
| 6,799,157 | B1 | 9/2004 | Kudo et al. |
| 7,412,658 | B2 | 8/2008 | Gilboa |
| 7,428,535 | B1 | 9/2008 | Peyton et al. |
| 7,783,590 | B2 | 8/2010 | Fukazawa et al. |
| 7,924,444 | B2 | 4/2011 | Takahashi |
| 7,965,402 | B2 | 6/2011 | Saito |
| 2003/0103232 | A1 | 6/2003 | Twede |
| 2004/0059716 | A1* | 3/2004 | Shiraishi ........... G06F 17/30011 |
| 2004/0080770 | A1 | 4/2004 | Hirose et al. |
| 2004/0135823 | A1 | 7/2004 | Wingett et al. |
| 2004/0190046 | A1 | 9/2004 | Ilda |
| 2004/0193717 | A1 | 9/2004 | Tajima et al. |
| 2004/0194010 | A1 | 9/2004 | Kirihara et al. |
| 2004/0194011 | A1 | 9/2004 | Matsumura |
| 2004/0199399 | A1 | 10/2004 | Sugiyama |
| 2004/0199896 | A1 | 10/2004 | Goodman et al. |
| 2004/0205376 | A1 | 10/2004 | Iida |
| 2004/0205758 | A1 | 10/2004 | Hikawa et al. |
| 2005/0015639 | A1 | 1/2005 | Cornelius et al. |
| 2005/0027733 | A1 | 2/2005 | Donahue |
| 2005/0027825 | A1 | 2/2005 | Hikawa et al. |
| 2005/0039126 | A1* | 2/2005 | Katano .............. H04N 1/00509 715/700 |
| 2005/0066304 | A1 | 3/2005 | Tattrie et al. |
| 2005/0105135 | A1 | 5/2005 | Takahashi |
| 2005/0206939 | A1 | 9/2005 | Tsutsumi et al. |
| 2006/0005140 | A1 | 1/2006 | Crew et al. |
| 2006/0028667 | A1 | 2/2006 | Saito |
| 2006/0036964 | A1 | 2/2006 | Satterfield et al. |
| 2006/0080616 | A1 | 4/2006 | Vogel et al. |
| 2006/0293765 | A1* | 12/2006 | Tanaka ............... H04N 1/00408 700/15 |
| 2007/0038946 | A1* | 2/2007 | Grieshaber ........ H04N 1/00464 715/762 |
| 2007/0106987 | A1 | 5/2007 | Makino |
| 2007/0195370 | A1 | 8/2007 | Suga et al. |
| 2007/0277116 | A1 | 11/2007 | Nakajima |
| 2007/0279667 | A1 | 12/2007 | Hattori et al. |
| 2008/0263447 | A1 | 10/2008 | Garg et al. |

FOREIGN PATENT DOCUMENTS

| | | |
|---|---|---|
| JP | 2003-036129 | 2/2003 |
| JP | 2003-233473 | 8/2003 |
| JP | 2004240644 | 8/2004 |
| KR | 2003-6648 | 1/2003 |
| KR | 2004-240644 | 8/2004 |
| KR | 10-0574019 | 7/2005 |
| KR | 1020050075229 | 7/2005 |
| KR | 2005-119645 | 12/2005 |
| KR | 2006-13237 | 2/2006 |
| KR | 1020060050269 | 5/2006 |

OTHER PUBLICATIONS

Restriction Requirement dated Feb. 10, 2011 in copending U.S. Appl. No. 12/054,550.
Office Action dated Mar. 29, 2011 in copending U.S. Appl. No. 12/054,550.
Final Office Action dated Sep. 28, 2011 in copending U.S. Appl. No. 12/054,550.
Advisory Action dated Jan. 5, 2012 in copending U.S. Appl. No. 12/054,550.
Office Action dated Apr. 26, 2012 in copending U.S. Appl. No. 12/054,550.
Final Office Action dated Sep. 25, 2012 in copending U.S. Appl. No. 12/054,550.
Advisory Action dated Jan. 2, 2013 in copending U.S. Appl. No. 12/054,550.
Office Action dated Jun. 4, 2013 in copending U.S. Appl. No. 12/054,550.
Final Office Action dated Oct. 23, 2013 in copending U.S. Appl. No. 12/054,550.
Office Action dated Mar. 21, 2014 in copending U.S. Appl. No. 12/054,550.
Final Office Action dated Jul. 31, 2014 in copending U.S. Appl. No. 12/054,550.
Chinese Office Action dated Mar. 24, 2011 in CN Application No. 00810091366.9.
Korean Office Action dated Apr. 29, 2011 in KR Application No. 10-2007-0063813.
Korean Office Action dated Sep. 26, 2011 issued in KR Application No. 10-2007-0069356.
Korean Office Action dated Oct. 21, 2011 issued in KR Application No. 10-2007-0063813.
Notice of Allowance dated Jun. 8, 2016 in copending U.S. Appl. No. 13/726,857.
Notice of Allowance dated Feb. 4, 2016 in copending U.S. Appl. No. 13/726,857.
Office Action dated Sep. 30, 2015 in copending U.S. Appl. No. 13/726,857.
Notice of Allowance dated Jun. 26, 2015 in copending U.S. Appl. No. 13/726,857.
Final Office Action dated Dec. 31, 2014 in copending U.S. Appl. No. 13/726,857.
Office Action dated Aug. 14, 2014 in copending U.S. Appl. No. 13/726,857.
Final Office Action dated Apr. 29, 2014 in copending U.S. Appl. No. 13/726,857.
Office Action dated Dec. 11, 2013 in copending U.S. Appl. No. 13/726,857.
Korean Trial Decision dated Jul. 31, 2013 issued in KR Application No. 10-2007- 0063813.
U.S. Appl. No. 12/054,550, filed Mar. 25, 2008, Hyun-wook Park, Samsung Electronics Co., Ltd.
U.S. Appl. No. 13/726,857, filed Dec. 26, 2012, Hyun-wook Park, Samsung Electronics Co., Ltd.

* cited by examiner

METHOD AND APPARATUS TO INPUT WORKFLOW STEPS AND PARAMETERS

CROSS-REFERENCE TO RELATED APPLICATIONS

This is a Continuation application of U.S. Ser. No. 13/726,857, filed on Dec. 26, 2012 which is a Divisional application of prior U.S. application Ser. No. 12/054,550, filed on Mar. 25, 2008 in the U.S. Patent and Trademark Office, which claims priority under 35 U.S.C. § 119(a) from Korean Patent Application No. 10-2007-0063813, filed on Jun. 27, 2007, and Korean Patent Application No. 10-2007-0069356, filed on Jul. 10, 2007, in the Korean Intellectual Property Office, the disclosures of which are incorporated herein in their entirety by reference.

BACKGROUND OF THE INVENTION

1. Field of the Invention

The present general inventive concept relates to an image forming apparatus, and more particularly, to image forming method and apparatus to allow a user to check progress states of a plurality of operations on a screen by using a user interface to dynamically create the plurality of operations and to determine setup information according to the user's intentions. The present general inventive concept also relates to an image forming method and apparatus and a host to allow a user to newly generate a desired application to execute operations.

2. Description of the Related Art

Conventionally, a user can select one of selectable operations (e.g., copying, scanning, faxing, printing, etc.) through a user interface of an image forming apparatus. If the user selects one operation, the user can set only detailed setup information corresponding to the selected operation on the user interface. Thus, when the user desires to e-mail, print, and fax copied data, the user cannot continuously execute such operations. Also, if the user does not fully know about a multi-functional peripheral (MFP) having multi-functions, the user cannot easily use the multi-functions of the MFP due to complexity of the MFP.

Also, when products such as printers or MFPs come out, usable software functions are realized as firmware. Thus, if products are sold, functions of software of the products cannot be changed or added. In order to solve this problem, open architectures have been developed in the MFP industry so as to add new functions or select and mount only software necessary for each user. Examples of the open architectures include an OSGi-based architecture by Richo, a java-based Multifunctional Embedded Application Platform (MEAP) by Cannon, javascript-based JScribe architecture by IBM, etc. However, open architectures of image forming apparatuses such as MFPs, etc., which have recently been developed and come out, to open objects/application programming interfaces (APIs) of MFP platforms according to specifications developed by manufacturing companies and provide an integrated development environment (IDE) for developing new functions using the open objects/APIs. Accordingly, solution developers can develop solutions set to be suitable for additional functions of software and specific use environments and mount the solutions in products. This technology must be further developed. However, for substantial development of this technology, a large amount of time is required to thoroughly learn about object/API specifications open to corresponding products and a method of using IDE. Also, users not knowing about the technology cannot slightly change functions or realize desired functions. That is, conventional open architecture technology can be used by only developers and not by general users.

SUMMARY OF THE INVENTION

The present general inventive concept provides an image forming method and apparatus to easily set and to continuously execute a plurality of operations of a same set of image data on a screen.

The present general inventive concept also provides an image forming method and apparatus, and a host to allow a user to newly generate an application to execute operations according to settings of the user.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing an image forming method including setting a processing order of a plurality of operations of a same image data and detailed setup information of the plurality of operations, and executing the plurality of operations using the detailed setup information according to the set processing order.

The foregoing and/or other aspects and utilities of the general inventive concept may also be achieved by providing an image forming apparatus including a user interface unit to set a processing order of a plurality of operations of a same image data and detailed setup information of the plurality of operations, and a controller to control the plurality of operations to be executed using the detailed setup information according to the processing order.

The foregoing and/or other aspects and utilities of the general inventive concept may also be achieved by providing an image forming method including generating a graphical user interface (GUI) webpage corresponding to a plurality of operations on an image forming apparatus, generating an application profile corresponding to the plurality of operations using the GUI webpage, and generating an application corresponding to the application profile to execute the plurality of operations on the image forming apparatus.

The foregoing and/or other aspects and utilities of the general inventive concept may also be achieved by providing an image forming apparatus including an operation registration manager to register and manage information including types, detailed setup information, and execution information of a plurality of operations, an internal web server to generate a graphical user interface (GUI) webpage corresponding to the plurality of operations, and an operation executer to receive an application profile from a host to generate the application profile corresponding to the plurality of operations using the GUI webpage, to generate an application corresponding to the application profile, and to execute the plurality of operations.

The foregoing and/or other aspects and utilities of the general inventive concept may also be achieved by providing a host including a generator to generate an application profile corresponding to a plurality of operations using a graphical user interface (GUI) webpage, wherein the GUI webpage corresponds to the plurality of operations of an image forming apparatus.

The foregoing and/or other aspects and utilities of the general inventive concept may also be achieved by providing an image forming apparatus including a user interface to allow a user to select a plurality of image forming operations to be performed on a same image data, and to set a processing order of the selected image forming operations, and a controller to process the selected image forming operations corresponding to at least the set processing order, wherein the set plurality of image forming operations are continuously processed.

The selecting of the plurality of image forming operations may include selecting icons corresponding to the respective image forming operations.

The setting of the processing order includes arranging the selected icons corresponding to the respective image forming operations in an order.

The user interface may include a setup window to allow the user to set detailed setup information corresponding to the plurality of image forming operations, wherein the controller processes the selected image forming operations corresponding to the respective detailed setup information.

The detailed setup information may include one or more of a size of a printing medium, a number of printed pages and a resolution.

The plurality of image forming operations may include one or more of a copying operation, a printing operation, a faxing operation and a scanning operation.

The user interface may display icons corresponding to image forming operations in response to an arbitrary operation.

The user interface may not display non-selected icons in response to a selection of an icon corresponding to a respective image forming operation.

The foregoing and/or other aspects and utilities of the general inventive concept may also be achieved by providing a method of performing image forming operations with an image forming apparatus, the method including selecting a plurality of image forming operations to be performed on a same image data, setting a processing order of the selected image forming operations, and processing the selected image forming operations corresponding to at least the set processing order such that the set plurality of image forming operations are continuously processed.

The method may further include setting detailed setup information corresponding to the plurality of image forming operations.

The processing of the selected image forming operations may further include processing the selected image forming operations corresponding to the respective detailed setup information.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
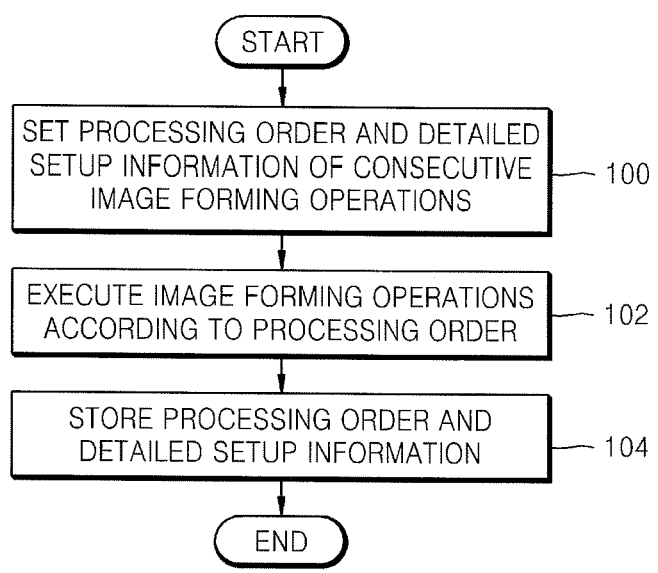
FIG. 1 is a flowchart illustrating an image forming method according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a flowchart illustrating an image forming method according to an embodiment of the present general inventive concept.

In operation 100, a processing order and detailed setup information of a plurality of operations of a same image data are set. The processing order refers to an order in which a plurality of image forming operations are continuously processed, e.g., copying, printing, faxing, scanning, etc. The detailed setup information refers to information which is set to execute the plurality of image forming operations, e.g., information regarding a size of a printing paper sheet, a number of printed pages, resolution, etc. which are set for the printing operation.

The present general inventive concept uses the processing order and the detailed setup information to continuously execute the plurality of image forming operations of the same image data.

In particular, in the present embodiment, icons indicating the plurality of image forming operations are arranged on a user interface screen to set the processing order, and the detailed setup information corresponding to each of the plurality of consecutive image forming operations is set. Processes of setting the processing order and detailed setup information will be described with reference to FIGS. 2 through 5.

Figure 2:
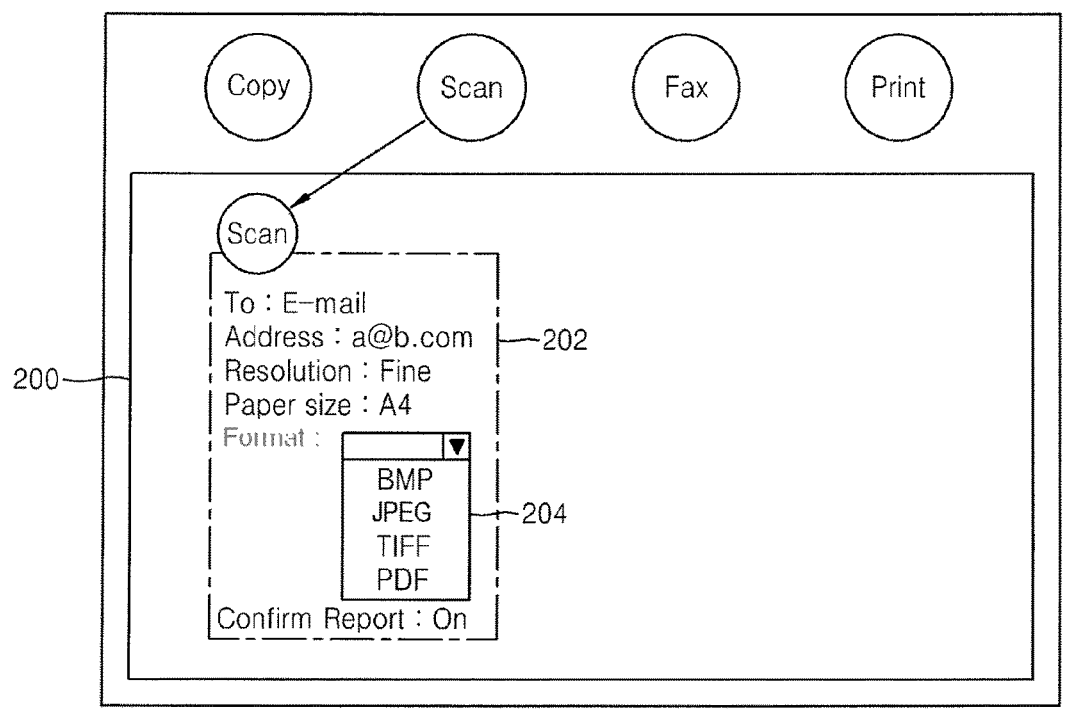
FIG. 2 illustrates a process of setting a scanning operation of a plurality of operations according to an embodiment of the present general inventive concept.

FIG. 2 illustrates a process of setting a scanning operation of a plurality of operations according to an embodiment of the present general inventive concept. An identification (ID) 200 illustrated in FIG. 2 indicates a user interface screen to set the processing order. When icons of operations a user desires to process are arranged on the user interface screen, the processing order of the operations is set according to an arrangement order of the icons. Here, a drag-and-drop method is used to arrange the icons indicating a plurality of operations on the user interface screen. An icon for a scanning operation is arranged on the user interface screen using the drag-and-drop method to be set to an operation to be executed.

After the icons indicating the operations are arranged, detailed setup information corresponding to the operations is set. The detailed setup information is set according to detailed setup information input through a setup window. An ID 202 indicates detailed setup information for a scanning operation, and an ID 204 indicates a setup window to set detailed setup information using a drop-down method. The detailed setup information of the scanning operation may be information regarding whether results of the scanning operation are to be transmitted to a host or transmitted through an e-mail, resolution, a size of a printing paper sheet, reports, etc.

Figure 3:
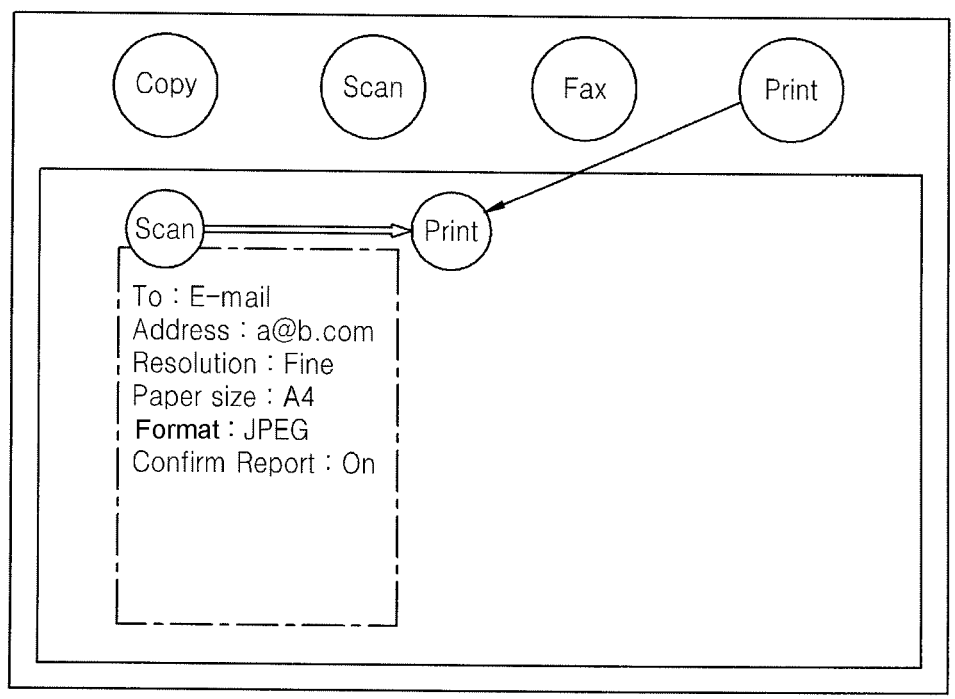
FIG. 3 illustrates a process of setting a printing operation to be executed after a scanning operation, according to an embodiment of the present general inventive concept.

FIG. 3 illustrates a process of setting a printing operation to be executed after a scanning operation, according to an embodiment of the present general inventive concept. If a printing operation is to be executed using data on which a scanning operation has been executed, an icon indicating the scanning operation is arranged on a user interface screen, and then an icon indicating the printing operation is arranged on the user interface screen as illustrated in FIG. 3. Here, when icons indicating a plurality of operations are arranged on the user interface screen, non-executable operations are not arranged but an error message is displayed.

In the present general inventive concept, icons indicating executable operations are displayed after an arbitrary operation, and an operation processing order corresponding to an icon selected from the displayed icons is set. Also, only the selected icon of the icons indicating the executable operations is displayed after an arbitrary operation, and displays of the other icons are removed.

Figure 4:
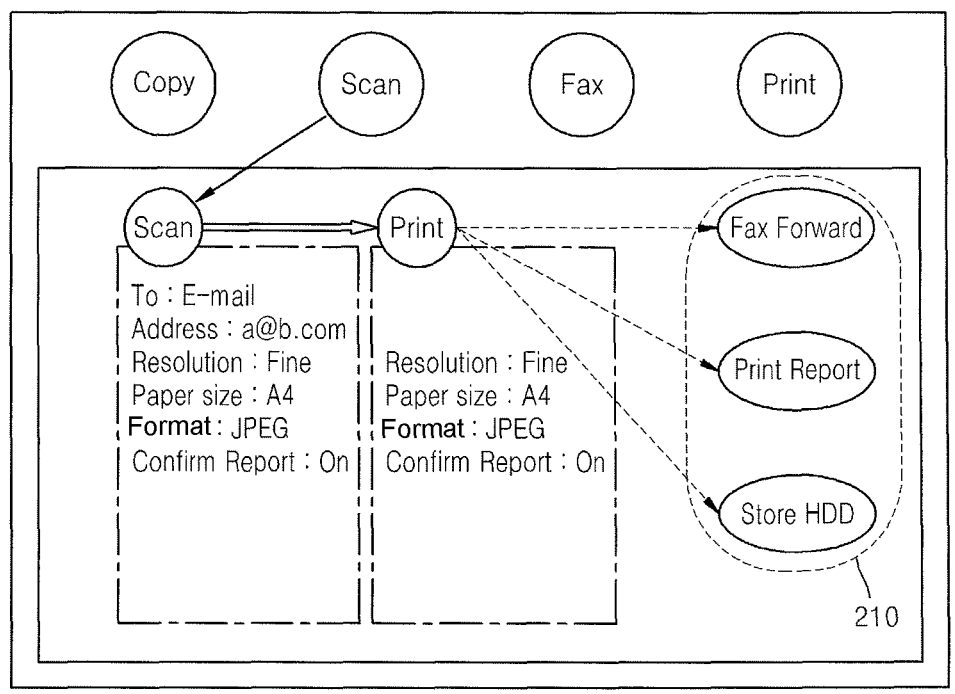
FIG. 4 illustrates icons of operations to be executed after a printing operation, according to an embodiment of the present general inventive concept.

FIG. 4 illustrates icons of operations to be executed after a printing operation, according to an embodiment of the present general inventive concept. Icons corresponding to an ID 210 refers to icons which correspond to operations to be executed after a printing operation, i.e., icons of report printing, fax forwarding, and data storing. As illustrated in FIG. 4, icons, which correspond to operations to be executed after a printing operation, are displayed. A user can select one of the icons of report printing, fax forwarding, and data storing. If the user selects fax forwarding, only the icon of fax forwarding is displayed and the icons of report printing and data storing and thus are not displayed.

Figure 5:
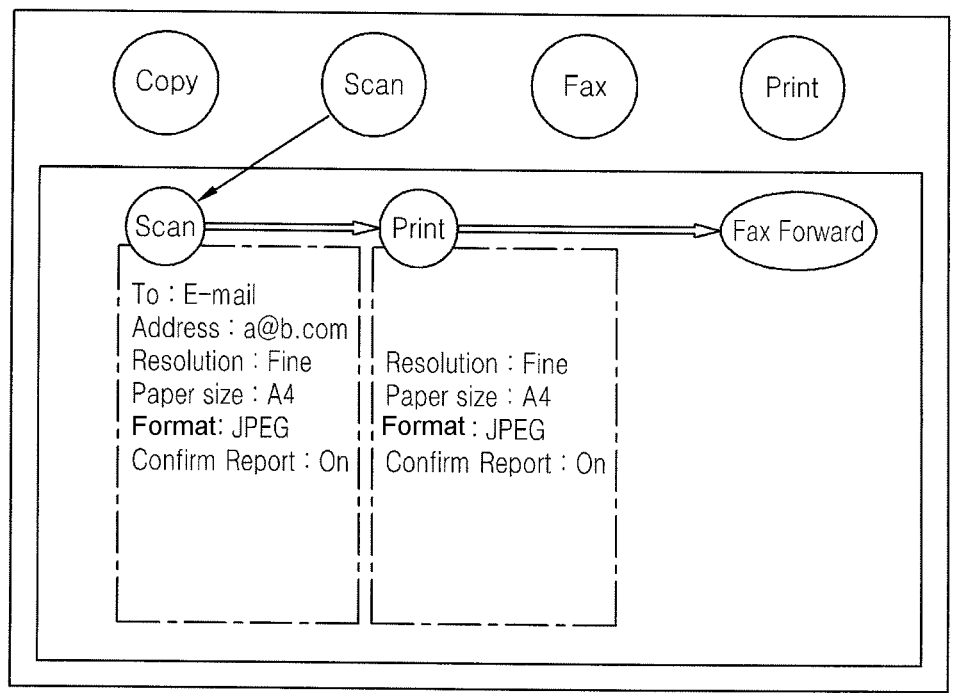
FIG. 5 illustrates icons disappearing if fax forwarding is selected as an operation to be executed after a printing operation, according to an embodiment of the present general inventive concept.

FIG. 5 illustrates icons disappearing if fax forwarding is selected as an operation to be executed after a printing operation, according to an embodiment of the present general inventive concept. A user can check information regarding operations to be executed after an arbitrary operation and can easily select a desired operation therefrom.

If the user desires to arrange an icon of a non-executable operation on a user interface screen together with icons indicating a plurality of operations, the user may not arrange the icon on the user interface screen but may display an error message. Thus, the user can check on the display whether an error message that an operation corresponding to an icon selected by the user cannot be executed.

In operation 102, the plurality of operations are executed according to the processing order using the detailed setup information. That is, the corresponding operations are continuously executed using the processing order and the detailed setup information determined in operation 100. For example, if the processing order is set to the order of a scanning operation, a printing operation, and fax forwarding as illustrated in FIGS. 2 through 5, the plurality of operations of the same image data are sequentially executed with reference to the set detailed setup information of each of the plurality of operations.

In operation 104, the processing order and the detailed setup information are stored. That is, information regarding the operation processing order and detailed setup information created by a user can be stored so as to be re-used later. In the present embodiment, the operation processing order and detailed setup information are stored after operations are completely executed. However, the operation processing order and the detailed setup information may be stored during the executions of the operations.

The image forming method of FIG. 1 operates during executions of operations or on standby for the operations. That is, the operation processing order and the detailed setup information may be set to continuously execute additional operations even during the executions of the respective operations.

An image forming apparatus according to the present general inventive concept will now be described in detail with reference to the attached drawings.

Figure 6:
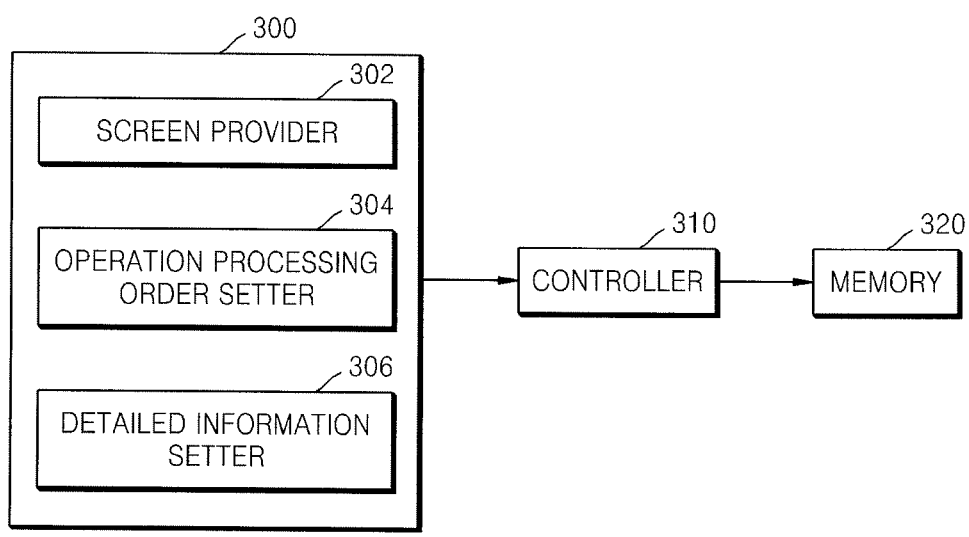
FIG. 6 is a block diagram illustrating an image forming apparatus according to an embodiment of the present general inventive concept.

FIG. 6 is a block diagram illustrating an image forming apparatus according to an embodiment of the present general inventive concept. Referring to FIG. 6, the image forming apparatus includes a user interface unit 300, a controller 310, and a memory 320.

The user interface unit 300 sets the processing order and detailed setup information of a plurality of operations of the same image data and outputs set results to the controller 310. For this purpose, the user interface unit 300 includes a screen provider 302, an operation processing order setter 304, and a detailed information setter 306.

The screen provider 302 provides a user interface screen to set the processing order. The ID 200 illustrated in FIG. 2 indicates such a user interface screen. The screen provider 302 displays the user interface screen on which icons indicating the plurality of operations are arranged.

The operation processing order setter 304 arranges the icons indicating the plurality of operations on the user interface screen to set the processing order and outputs the set results to the controller 310. The operation processing order setter 304 arranges icons indicating a plurality of image forming operations on the user interface screen using a drag-and-drop method.

The operation processing order setter 304 displays icons indicating executable operations after an arbitrary operation on the user interface screen and sets an operation processing order corresponding to an icon selected from the displayed icons. The operation processing order setter 304 also displays only the selected icon and removes displays of the other icons.

The operation processing order setter 304 displays an icon indicating a scanning operation and then an icon indicating a printing operation on the user interface screen as illustrated in FIG. 3. The operation processing order setter 304 also displays icons corresponding to operations to be executed after the printing operation as illustrated in FIG. 4. A user can select one of icons of report printing, fax forwarding, and data storing. If the user selects fax forwarding, the operation processing order setter 304 displays only the icon of fax forwarding and removes the icons of report printing and data storing. That is, if fax forwarding is selected as an operation to be executed after the printing operation, the other icons disappear as illustrated in FIG. 5.

If the user desires to arrange non-executable operations together with icons indicating the plurality of operations on the user interface screen, the operation processing order setter 304 displays an error message instead of icons of the non-executable operations. The user can check through the display of the error message that an operation corresponding to an icon selected by the user is non-executable.

The detailed information setter 306 sets the detailed setup information of the plurality of operations and outputs the set results to the controller 310. The detailed information setter 306 sets the detailed setup information according to detailed setup information input through a setup window using a drag-and-drop method. If the operation processing order setter 304 arranges an icon indicating an operation on the user interface screen, the detailed information setter 306 sets detailed setup information corresponding to the arranged icon of the operation. The detailed information setter 306 displays the setup window using the drag-and-drop method and sets information input through the setup window as detailed setup information.

The controller 310 controls the plurality of operations to be continuously executed using the processing order set by the operation processing order setter 304 and the detailed setup information set by the detailed information setter 306. For example, if the processing order are set to the order of a scanning operation, a printing operation, and fax forwarding as illustrated in FIGS. 2 through 5, the controller 310 sequentially executes the scanning operation, the printing operation, and fax forwarding of the same image data with reference to detailed setup information set for the scanning operation, the printing operation, and fax forwarding. The controller 310 also controls the memory 320 to store the set processing order and detailed setup information.

The memory 320 is a non-volatile memory and is controlled by the controller 310 to store the processing order and the detailed setup information.

The above-described image forming apparatus operates during executions of operations or on standby for the operations. Even when the operations are being executed, the image forming apparatus can set the operation processing order and detailed setup information to continuously execute additional operations. When the operations are on standby, the image forming apparatus can execute a plurality of operations.

An image forming method according to another embodiment of the present general inventive concept will now be described with reference to the drawings.

Figure 7:
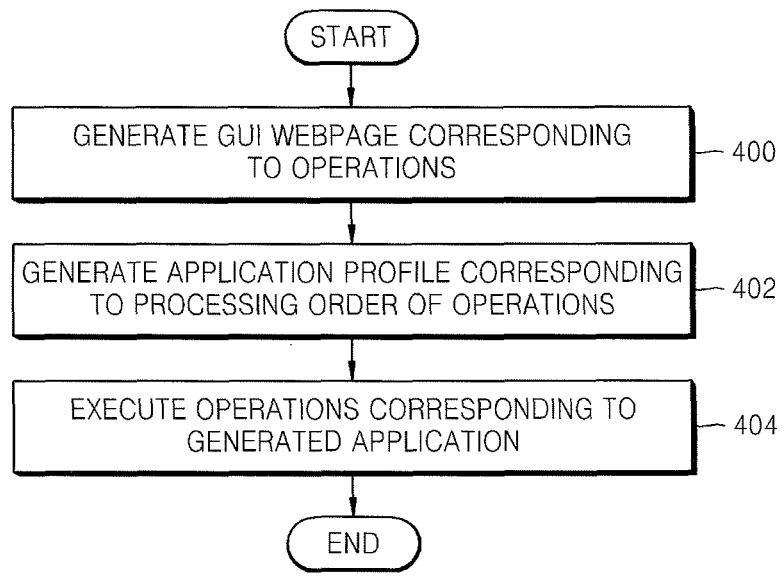
FIG. 7 is a flowchart illustrating an image forming method according to another embodiment of the present general inventive concept.

FIG. 7 is a flowchart of an image forming method according to another embodiment of the present general inventive concept.

In operation 400, a graphic user interface (GUI) webpage corresponding to a plurality of operations is generated on an image forming apparatus. Here, the plurality of operations may be referred to as objects indicating functions of the image forming apparatus. The objects indicate the abstracted functions of the image forming apparatus, and examples of the objects include objects "Print," "Scan," "Fax," "Image," "Ftp-client," "E-mail," etc.

Figure 8:
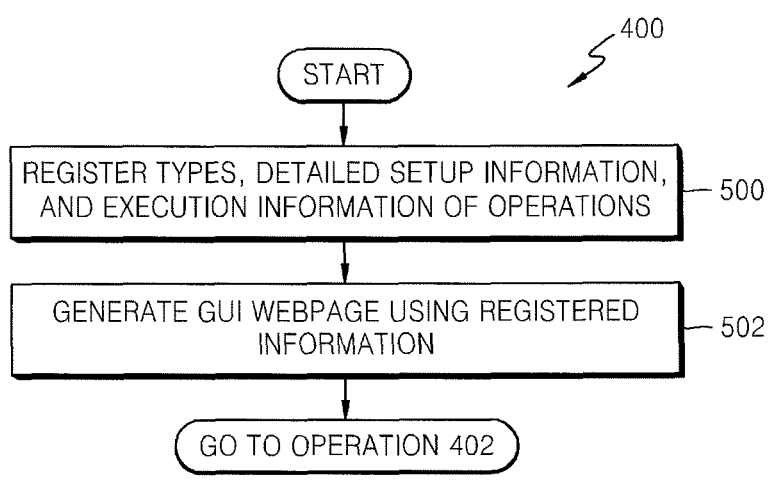
FIG. 8 is a flowchart illustrating operation 400 of the method of FIG. 7, according to an embodiment of the present general inventive concept.

FIG. 8 is a flowchart of operation 400 of the method of FIG. 7, according to an embodiment of the present general inventive concept.

In operation 500, information including types, detailed setup information, and execution information of the operations is registered. When a power source is applied to the image forming apparatus, the types of operations, i.e., types of objects, are registered, together with detailed setup information and operation execution information regarding the objects. The registered information is managed as a database.

Examples of the types of operations include print, scanner, fax, image, protocol, filter operations, etc. The types of operations indicate what types of functions operations are in charge of. The detailed setup information indicates attributes or set information of the operations, i.e., indicates the resolution in the scanner object, an ftp server IP address in the ftp-client object, etc. The operation execution information indicates function information to be executed by a corresponding operation, e.g., "Start scanning," "Stop scanning," etc. in the object "Scan," "Log in a ftp server," "Start ftp transmission," etc. in the object "Ftp-client."

In operation 502, the GUI webpage including a list menu of image forming operations and an edition menu of an application is generated using the registered information.

Figure 9:
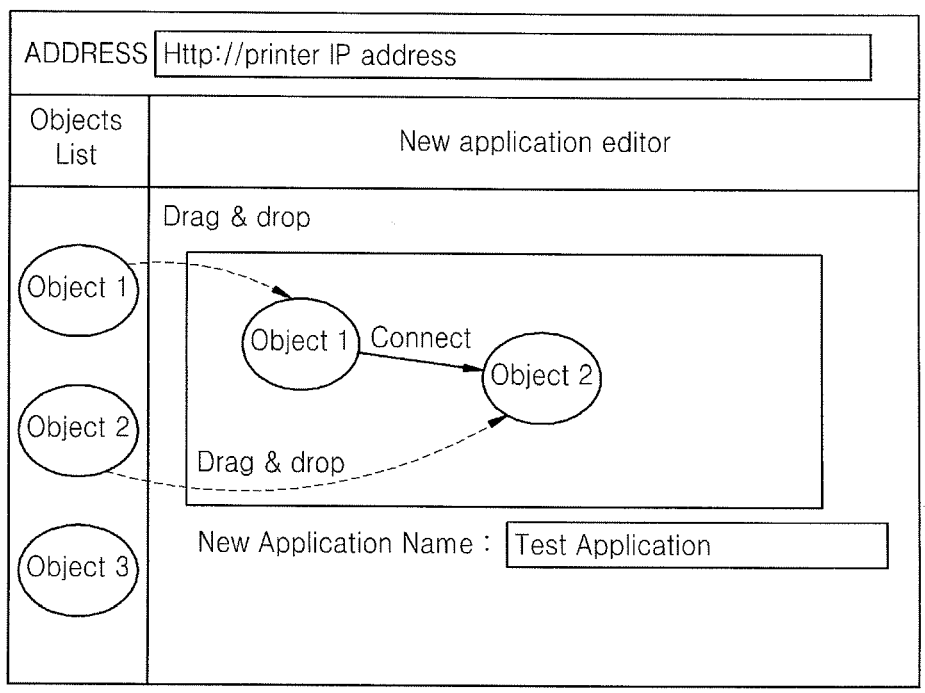
FIG. 9 illustrates a graphical user interface (GUI) webpage illustrating operation 502 of FIG. 8, according to an embodiment of the present general inventive concept.

FIG. 9 illustrates a GUI webpage illustrating operation 502 of FIG. 8, according to an embodiment of the present general inventive concept. As illustrated in FIG. 9, the GUI webpage includes a list menu of operations and an edition menu of an application. The list menu and the edition menu will be described in detail later.

In operation 402, an application profile corresponding to operations is generated on a host using the generated GUI webpage.

Figure 10:
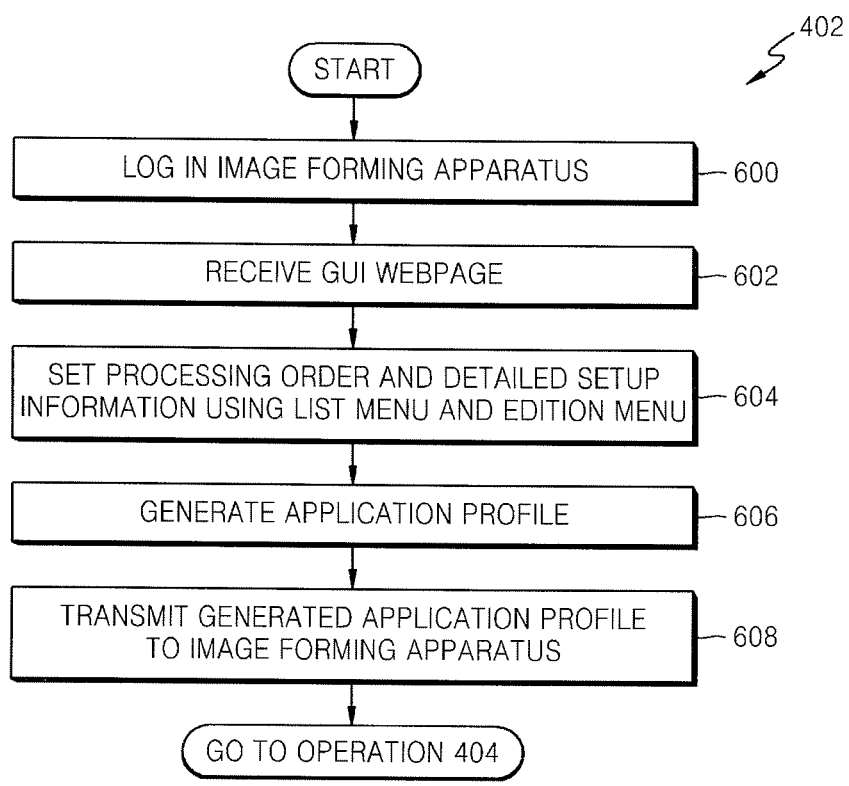
FIG. 10 is a flowchart illustrating operation 402 of the method of FIG. 7, according to an embodiment of the present general inventive concept.

FIG. 10 is a flowchart illustrating operation 402 of the method of FIG. 7, according to an embodiment of the present general inventive concept. Referring to FIG. 10, in operation 600, the host logs in the image forming apparatus. If a user activates a web browser of the host, the host logs in the image forming apparatus through the activated web browser.

In operation 602, the host receives the generated GUI webpage from the image forming apparatus. The received GUI is displayed on the web browser.

In operation 604, the processing order and detailed setup information of the image forming operations are set using the list menu of the image forming operations and the edition menu of the application, wherein the list and edition menus are included in the received GUI webpage. The list menu arranges and displays icons corresponding to operations, i.e., objects, according to the predetermined order. The edition menu of the application performs a function of setting the operation processing order and a function of generating an application profile corresponding to the operation processing order. The edition menu of the application is used to move the icons corresponding to the operations on the list menu onto the edition menu using a drag-and-drop method and to provide a user interface on which connection relations among the icons are created to set the operation processing order of the icons. The edition menu of the application is also used to generate the application profile corresponding to the set operation processing order.

An example of a GUI webpage displayed on a web browser is illustrated in FIG. 9. A user moves the icons corresponding to the operations on the list menu onto the edition menu using the drag-and-drop method and then creates the connection relations among the icons to set the operation processing order of the icons. For example, if the user creates the connection relations among the icons as illustrated in FIG. 9, the operation processing order of first and second objects are set. Also, detailed setup information of the first and second objects is also set using the edition menu of the application.

In operation 606, the application profile corresponding to the set operation processing order and detailed setup information is generated. The edition menu of the application generates a new application profile using the operation processing order and detailed setup information displayed on a screen. The application profile may be generated in an Extensible Markup Language (XML) format or a predetermined script format. The application profile includes information regarding types, detailed information, and the set processing order of operations.

In operation 608, the host transmits the generated application profile to the image forming apparatus.

In operation 404, the application profile is interpreted on the image forming apparatus to execute image forming operations corresponding to the operation processing order.

Figure 11:
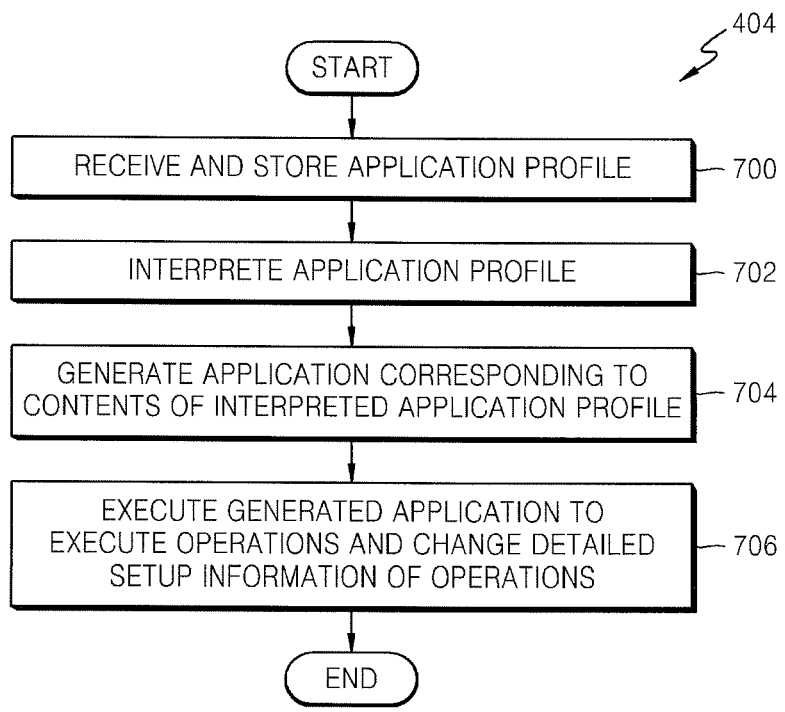
FIG. 11 is a flowchart illustrating operation 404 of the method of FIG. 7, according to an embodiment of the present general inventive concept.

FIG. 11 is a flowchart illustrating operation 404 of the method of FIG. 7, according to an embodiment of the present general inventive concept.

In operation 700, the image forming apparatus receives and stores the application profile generated by the host.

In operation 702, the stored application profile is interpreted. Here, the application profile is interpreted according to pre-defined rules.

In operation 704, an application corresponding to contents of the interpreted application profile is generated.

In operation 706, the generated application is executed so as to execute operations. Detailed setup information of the operations may be changed according to contents of the interpreted application profile.

Figure 12:
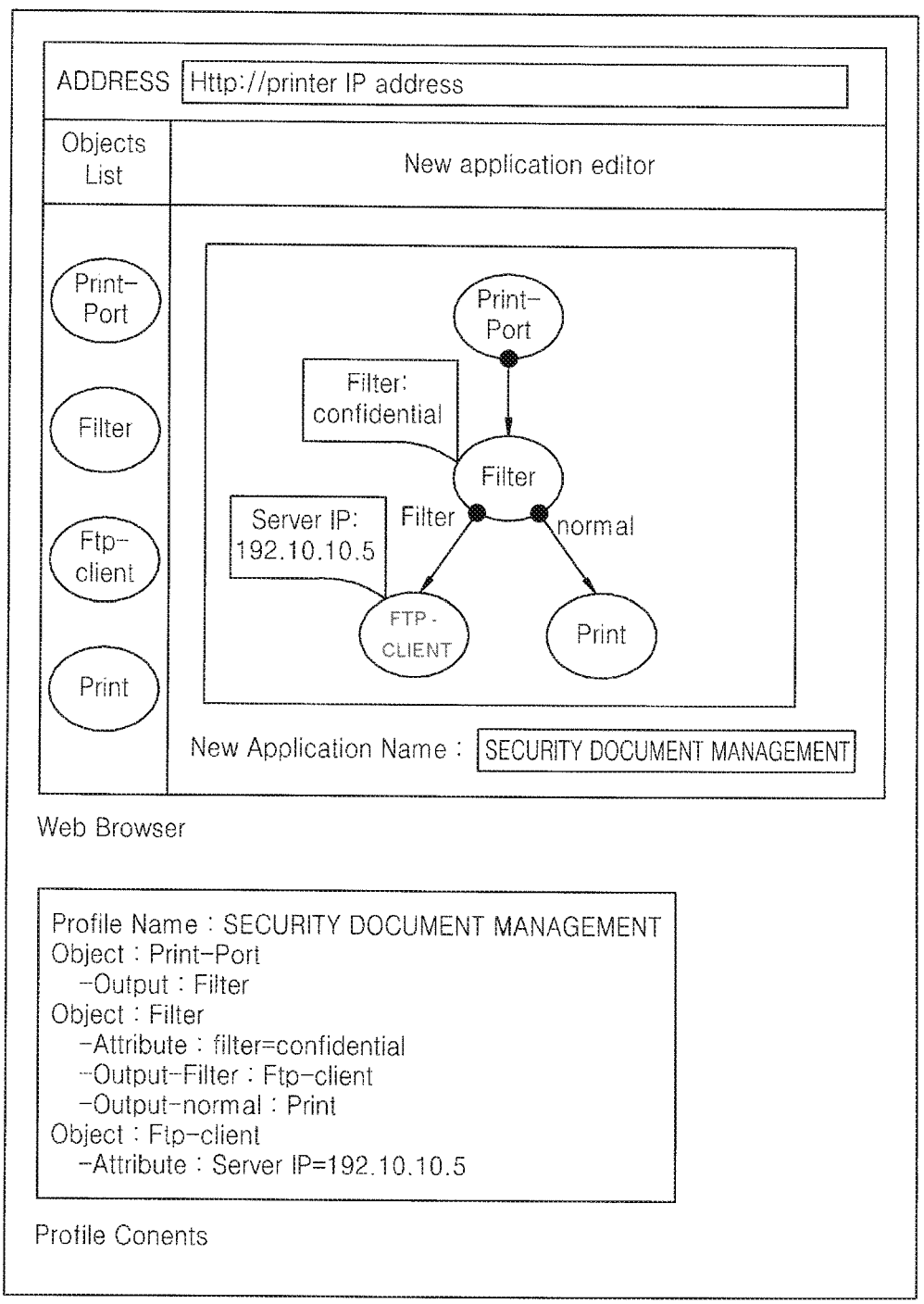
FIG. 12 illustrates a process of an image forming method of generating an application to manage a security document, according to an embodiment of the present general inventive concept.

FIG. 12 illustrates a process of an image forming method of generating an application to manage a security document, according to an embodiment of the present general inventive concept. As illustrated in FIG. 12, a user filters a document printed in an image forming apparatus, stores the document in an ftp server when the document includes items to be secured, and generates an application when the document is to be managed. The user accesses an internal web server of the image forming apparatus to create operations and processing order of the operations on an application edition menu as illustrated in FIG. 12. An object "Print-Port" indicates a port through which printed data is received in the image forming apparatus. The received printed data is transmitted to an object "Filter," and words "confidential" are stored in detailed setup information of the object "Filter" to filter the words "confidential" off the document. The printed document filtered by the object "Filter" is transmitted to an object "Ftp-client" connected to an output of the object "Filter," and the object "Ftp-client" stores the received document in the ftp server. A document unfiltered by the object "Filter" is transmitted to an object "Print" connected to a normal output so as to execute a printing operation. Here, if detailed setup information of objects is re-set by the user as illustrated in FIG. 12, the re-set detailed setup information is transmitted to the image forming apparatus so as to be changed according to re-set information.

As described above, an application profile created through a GUI webpage is transmitted to an image forming apparatus. The image forming apparatus interprets the application profile to generate an application to substantially perform a function of the application profile so as to execute operations according to the setting of a user.

Figure 13:
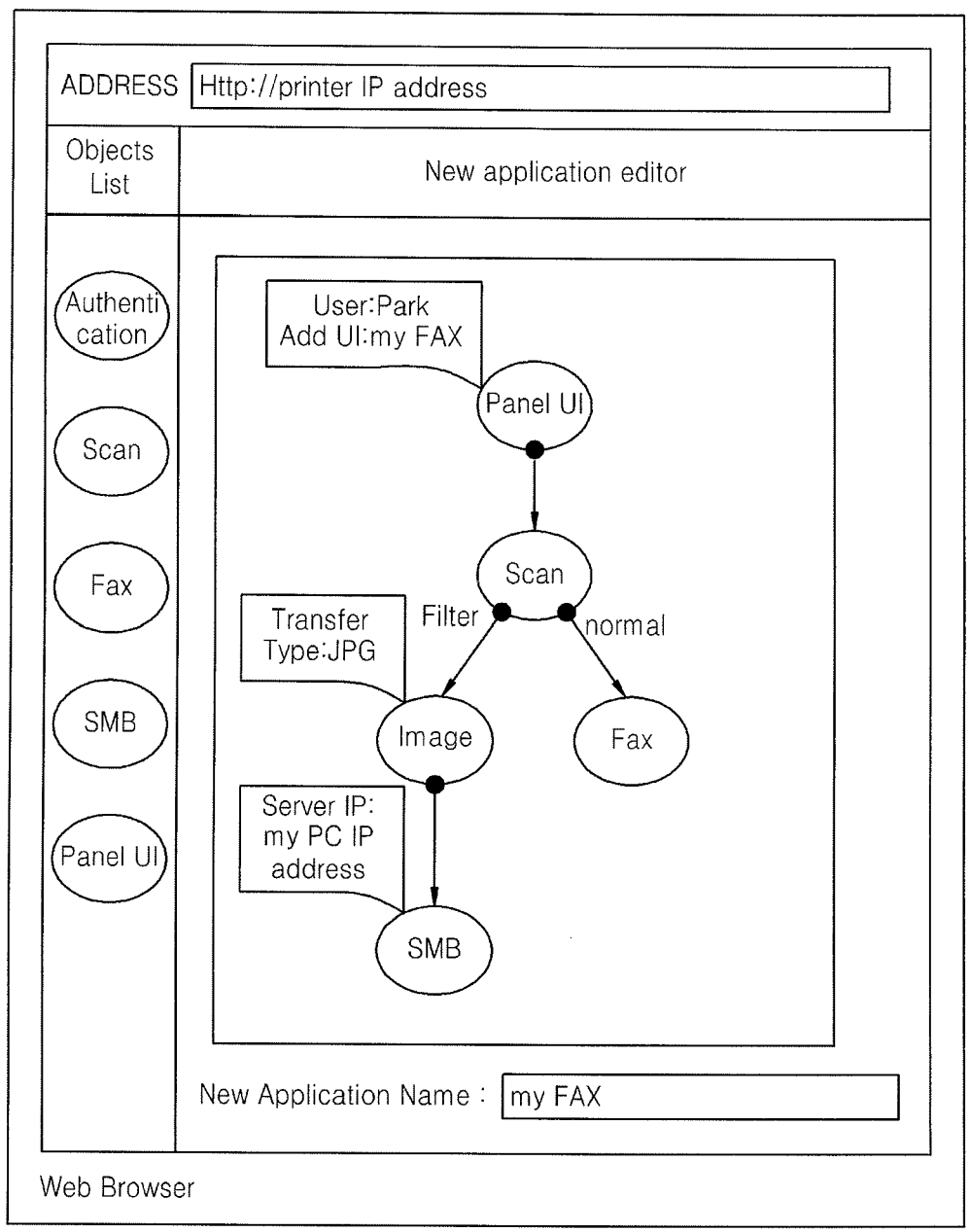
FIG. 13 illustrates a process of the image forming method of generating an application to manage a fax document, according to an embodiment of the present general inventive concept.

FIG. 13 illustrates a process of the image forming method of generating an application to manage a fax document, according to an embodiment of the present general inventive concept. It is assumed that a user named "Park" desires to store a copied document of an image in a personal computer (PC) of the user whenever the user faxes the image. In this case, the user accesses an internal web server of an image forming apparatus to create operations and the processing order of the operations on an application edition menu as illustrated in FIG. 13. A user name and an application name to be newly generated are registered in an object "Panel user interface (UI)." The object "Panel UI" is connected to an object "Scan," and objects "Fax" and "Image" are connected to an output of the object "Scan." In the object "Image," a format into which a scanned image is to be transformed is set to "JPG." The object "Image" is connected to an object "SMB," and a server information provider (IP) as detailed setup information is registered as a PC IP address of the user in the object "SMB." The contents are transformed into an application profile and transmitted to the image forming apparatus, and the image forming apparatus interprets and executes the application profile. If the application profile is executed, and the user logs in the object "Panel UI," the user may regard a menu "myFAX" generated by the user as an UI. If the menu "myFAX" is executed, a document may be scanned and faxed, and the scanned image may be transformed into a JPG file and transmitted to the PC of the user.

An image forming apparatus and a host according to the present general inventive concept will now be described in detail with reference to the attached drawings.

Figure 14:
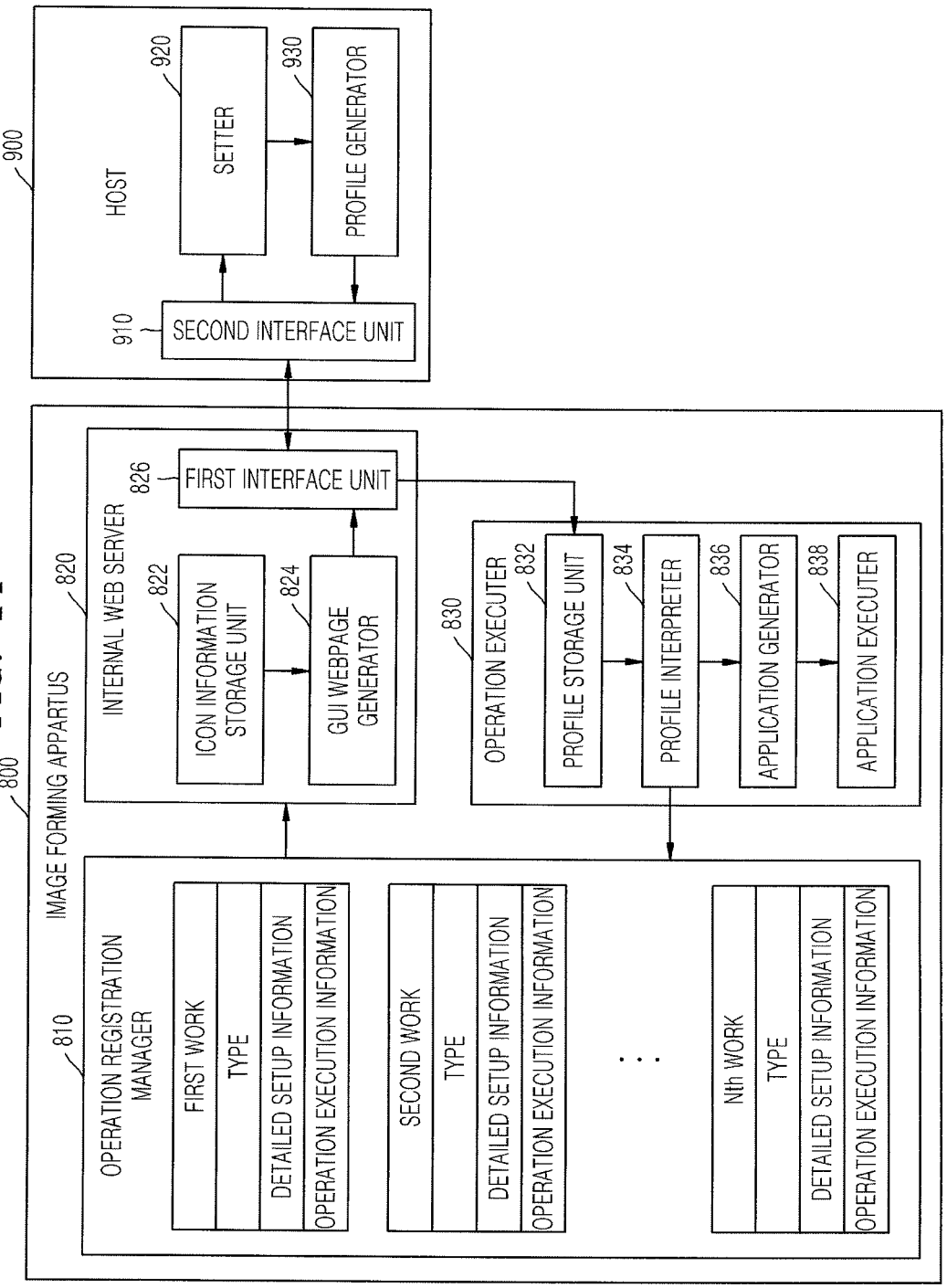
FIG. 14 is a block diagram illustrating an image forming apparatus and a host according to an embodiment of the present general inventive concept.

FIG. 14 is a block diagram illustrating an image forming apparatus and a host according to an embodiment of the present general inventive concept. Referring to FIG. 14, an image forming apparatus 800 generates a GUI webpage and interprets an application profile to execute operations corresponding to the processing order. For this purpose, the image forming apparatus 800 includes an operation registration manager 810, an internal web server 820, and an operation executer 830.

The operation registration manager 810 registers and manages information including types, detailed setup information, and execution information of a plurality of operations. As illustrated in FIG. 14, the operation registration manager 810 creates a database (DB) of a type, detailed setup information, and execution information of each of the plurality of operations, stores and manages the DB, and provides the DB to the internal web server 820. The operations indicate objects which indicate functions of the image forming apparatus 800. The types of the plurality of operations indicate what types of functions the operations are in charge of. The detailed setup information indicates attributes and set information of the operations, and the execution information is function information which can be executed by corresponding operations.

The internal web server 820 generates the GUI webpage corresponding to the operations and transmits the GUI webpage to a host 900. For this purpose, the internal web server 820 includes an icon information storage unit 822, a GUI webpage generator 824, and a first interface unit 826.

The icon information storage unit 822 stores icon information corresponding to the operations and outputs the icon information to the GUI webpage generator 824.

The GUI webpage generator 824 generates the GUI webpage using the registered information of the operations provided from the operation registration manager 810 and outputs the generated GUI webpage to the first interface unit 826. The GUI webpage includes a list menu of the operations and an edition menu of an application corresponding to the processing order of the operations. The list menu arranges and displays icons indicating symbols of the operations, i.e., objects, according to the predetermined order. The edition menu of the application executes a function of setting the processing order and a function of generating an application profile corresponding to the processing order.

The first interface unit 826 transmits the generated GUI webpage to the host 900.

The host 900 generates the application profile corresponding to the processing order of the operations using the GUI webpage corresponding to the operations of the image forming apparatus 800. For this purpose, the host 900 includes a second interface unit 910, a setter 920, and a profile generator 930.

The second interface unit 910 logs in the image forming apparatus 800 to receive the GUI webpage from the image forming apparatus 800 and outputs the GUI webpage to the setter 920.

The setter 920 sets the processing order and detailed setup information of the operations using the list menu of the operations and the edition menu of the application, wherein the list and edition menus are in the GUI webpage, and outputs the processing order and the detailed setup information to the profile generator 930.

The setter 920 moves the icons corresponding to the symbols of the operations on the list menu onto the edition menu using a drag-and-drop method and then provides a user interface so as to set the processing order and the detailed setup information. The processing order and the detailed setup information are set using the list menu and the edition menu as illustrated in FIG. 9.

The profile generator 930 generates the application profile corresponding to the processing order and the detailed setup information set by the setter 920 and outputs the application profile to the second interface unit 910. The application profile includes information regarding types, detailed setup information, and the processing order of the operations. The profile generator 930 may generate the application profile using an XML format or a predetermined script format.

The second interface unit 910 transmits the application profile to the image forming apparatus 800.

The first interface unit 826 receives the application profile generated by the host 900 and outputs the application profile to the operation executer 830.

The operation executer 830 interprets the application profile so as to execute image forming operations corresponding to the processing order. For this purpose, the operation executer 830 includes a profile storage unit 832, a profile interpreter 834, an application generator 836, and an application executer 838.

The profile storage unit 832 receives the application profile from the first interface unit 826, stores the application profile, and outputs the application profile to the profile interpreter 834.

The profile interpreter 834 interprets the application profile provided from the profile storage unit 832 and outputs contents of the interpreted application profile to the application generator 836 and the operation registration manager 810.

The application generator 836 generates an application corresponding to the contents of the interpreted application profile and outputs the generated application to the application executer 838.

The application executer 838 executes the generated application to execute the operations.

The operation registration manager 810 changes the detailed setup information of the operations according to the contents of the interpreted application profile.

As described above, in an image forming method and apparatus, and a host according to various embodiments of the present general inventive concept, a user can execute a plurality of image forming operations with a one-time action and simply perform setting of each of the plurality of image forming operations. Thus, if the user is to scan, fax, and e-mail a photograph and store the photograph in a storage medium of a multi-functional peripheral (MFP) without repeating operations of the same image data, the user can create image forming operations in the order of scanning, faxing, e-mailing, and storing so as to continuously execute the image forming operations without additional repeated operations.

Also, the user can provide an execution list of next executable functions to easily use convenient functions of the image forming apparatus top perform various functions.

In addition, if operations to be executed are non-executable, the user can select other executable operations or cancel the non-executable operations.

Moreover, the user can newly generate an application to execute desired operations. Thus, even if the user is not very knowledgeable about a management program of the functions of the image forming apparatus, the user can add and change the functions of the image forming apparatus.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus comprising:
a non-transitory computer readable recording medium to store information objects indicative of a plurality of operations to be executed by the image forming apparatus;
a controller to,
provide a web server to generate a graphical user interface (GUI) webpage usable to generate a profile of an application based upon the information objects, the GUI webpage usable through selectable displayed objects representative of a set of operations, among the plurality of operations, to be executed in an order by setting at least one connection relation among selected displayed objects and setting, in the order, setup information of operations in the set of operations, respectively, to define in the profile the order in which the set of operations including the setup information in the order are to be executed and to cause a change to setup information of the image forming apparatus corresponding to the plurality of operations; and
cause a hardware communication interface to,
serve the GUI webpage from the web server to a host computer in response to a request, and
receive, from the host computer, the profile of the application generated through the GUI,
wherein the controller is store the profile based upon which the application is executable according to information of selected displayed objects representative of a set of operations and selected setup information of operations corresponding to the selected displayed objects, respectively, in an order in which the selected setup information is to change the setup information corresponding to the plurality of operations, respectively, when the set of operations are to be executed in the order.

2. The image forming apparatus of claim 1, wherein the set of operations are executed based on the profile of the application.

3. The image forming apparatus of claim 1, wherein the set of operations includes one or more of scanning operation, printing operation, sending operation and storing operation.

4. The image forming apparatus of claim 1, wherein the setup information includes attribute information of the set of operations.

5. A method by an image forming apparatus, the method comprising:
storing information objects indicative of a plurality of operations to be executed by the image forming apparatus;
generating, by a web server, a graphical user interface (GUI) webpage usable to generate a profile of an application based upon the information objects, the GUI webpage usable through selectable displayed objects representative of a set of operations, among the plurality of operations, to be executed in an order by setting at least one connection relation among selected displayed objects and setting, in the order, setup information of operations in the set of operations, respectively, to define in the profile the order in which the set of operations including the setup information in the order are to be executed and to cause a change to setup information of the image forming apparatus corresponding to the plurality of operations;
serving the GUI webpage from the web server to a host computer in response to a request;
receiving, from the host computer, the profile of the application generated through the GUI; and
storing the profile based upon which the application is executable according to information of selected displayed objects representative of a set of operations and selected setup information of operations corresponding to the selected displayed objects, respectively, in an order in which the selected setup information is to change the setup information corresponding to the plurality of operations, respectively, when the set of operations are to be executed in the order.

6. The image forming method of claim 5, wherein the method further comprises executing the set of operations based on the profile of the application.

7. The image forming method of claim 5, wherein the set of operations includes one or more of scanning operation, printing operation, sending operation and storing operation.

8. The image forming method of claim 6, wherein the setup information includes attribute information of the set of operations.

9. A non-transitory computer readable recording medium having recorded thereon a program to execute a method for an image forming apparatus by:
storing information objects indicative of a plurality of operations to be executed by the image forming apparatus;
generating, by a web server, a graphical user interface (GUI) webpage usable to generate a profile of an application based upon the information objects, the GUI webpage usable through selectable displayed objects representative of a set of operations, among the plurality of operations, to be executed in an order by setting at least one connection relation among selected displayed objects and setting, in the order, setup information of operations in the set of operations, respectively, to define in the profile the order in which the set of operations including the setup information in the order are to be executed and to cause a change to setup information of the image forming apparatus corresponding to the plurality of operations;
serving the GUI webpage from the web server to a host computer in response to a request;
receiving, from the host computer, the profile of the application generated through the GUI; and
storing the profile based upon which the application is executable according to information of selected displayed objects representative of a set of operations and selected setup information of operations corresponding to the selected displayed objects, respectively, in an order in which the selected setup information is to change the setup information corresponding to the plurality of operations, respectively, when the set of operations are to be executed in the order.

10. The non-transitory computer readable recording medium of claim 9, wherein the set of operations are executed on the profile of the application.

11. The non-transitory computer readable recording medium of claim 9, wherein the set of operations includes one or more of scanning operation, printing operation, sending operation and storing operation.

* * * * *